United States Patent
Kuo et al.

(10) Patent No.: US 9,503,554 B1
(45) Date of Patent: Nov. 22, 2016

(54) PORTABLE ELECTRONIC APPARATUS

(71) Applicants: Interface Optoelectronics (ShenZhen) Co., Ltd., Shenzhen (CN); General Interface Solution Limited, Miaoli County (TW)

(72) Inventors: Shih-Ming Kuo, Guangdong (CN); Yue-Feng Yang, Guangdong (CN); Wei-Chung Chuang, Guangdong (CN); Yen-Heng Huang, Guangdong (CN)

(73) Assignees: INTERFACE OPTOELECTRONICS (SHENZHEN) CO., LTD., Shenzhen (CN); GENERAL INTERFACE SOLUTION LIMITED, Miaoli County (TW)

( * ) Notice: Subject to any disclaimer, the term of this patent is extended or adjusted under 35 U.S.C. 154(b) by 0 days.

(21) Appl. No.: 15/095,156

(22) Filed: Apr. 10, 2016

(30) Foreign Application Priority Data

Nov. 13, 2015 (CN) .......................... 2015 1 0776986

(51) Int. Cl.
*H04M 1/00* (2006.01)
*H04M 1/02* (2006.01)

(52) U.S. Cl.
CPC ......... *H04M 1/0266* (2013.01); *H04M 1/0264* (2013.01); *H04M 1/0277* (2013.01); *H04M 2250/22* (2013.01); *H04M 2250/52* (2013.01)

(58) Field of Classification Search
CPC ........... H04M 1/0266; H04M 1/0264; H04M 1/0277; H04M 2250/22; H04M 2250/52
USPC ........................ 455/575.1, 566; 345/173–177
See application file for complete search history.

(56) References Cited

U.S. PATENT DOCUMENTS

| | | | | |
|---|---|---|---|---|
| 8,554,287 B1* | 10/2013 | Rao | ......................... | G06F 21/32 361/679.55 |
| 9,171,506 B2* | 10/2015 | Ishihara | ............. | H04N 5/23241 |
| 9,261,957 B2* | 2/2016 | Kim | ....................... | G06F 3/0485 |
| 2009/0160820 A1* | 6/2009 | Lii | .......................... | G06F 3/044 345/174 |
| 2011/0029185 A1* | 2/2011 | Aoki | ...................... | B60K 37/06 701/31.4 |
| 2013/0009883 A1* | 1/2013 | Chen | ....................... | G02F 1/167 345/173 |
| 2015/0163939 A1* | 6/2015 | Park | .................... | H01L 27/3276 361/749 |
| 2016/0018915 A1* | 1/2016 | Kuo | ...................... | G06F 3/0416 345/173 |

* cited by examiner

*Primary Examiner* — Dominic Rego
(74) *Attorney, Agent, or Firm* — CKC & Partners Co., Ltd.

(57) ABSTRACT

A portable electronic apparatus includes a first touch-sensing substrate, a camera module, transmission routes, a flexible printed circuit, and a main board. The first touch-sensing substrate has an active area and a peripheral area surrounding the active area. The camera module is connected to a second connecting area of the peripheral area. At least one of the transmission routes connects between a first connecting area and the second connecting area of the peripheral area, and rest of the transmission routes respectively connect between the active area and the first connecting area. The flexible printed circuit connects to the first connecting area. The flexible printed circuit includes a touch-sensor driver. The touch-sensor driver is electrically connected to at least part of the transmission routes. The main board includes a connector. The connector is connected with an end of the flexible printed circuit.

12 Claims, 5 Drawing Sheets

PORTABLE ELECTRONIC APPARATUS

RELATED APPLICATIONS

This application claims priority to Chinese Application Serial Number 201510776986.6, filed Nov. 13, 2015, which is herein incorporated by reference.

BACKGROUND

Field of Invention

The present disclosure relates to a portable electronic apparatus. More particularly, the present disclosure relates to a portable electronic apparatus with a touch sensor module and a camera module.

Description of Related Art

In order to fulfill the demands of a user's reliance on touch sensing control interface and photographing functions, a portable electronic apparatus (for example, smart phone, tablet PC . . . etc.) including a touch sensor module and a camera module has become more and more widespread. However, a main board of a conventional portable electronic apparatus connected and controlling a touch sensor module and a camera module usually needs to install two separated connectors configured to be connected to the flexible printed circuits of the touch sensor module and the camera module respectively. As a consequence, the assembling process of the conventional portable electronic apparatus also needs to dispose the connectors separately, and connect the flexible printed circuits of the touch sensor module and the camera module to the connectors respectively. That is to say, the complexity of assembling the portable electronic apparatus, as well as, the consumption of time and the cost of fabricating the portable electronic apparatus, may be increased with increasing the quantity of connectors. To reduce consuming of components while assembling a portable electronic apparatus, as well as, the cost of components and assembling time, practitioners of ordinary skill in the art have striven to attain a solution, still lacks a suitable solution to be developed. Therefore, to deal with aforesaid problem effectively is an important subject of research and development, and also a desired improvement in the art.

SUMMARY

The present disclosure provides a portable electronic apparatus. The portable electronic apparatus includes a first touch-sensing substrate, a camera module, transmission routes, a flexible printed circuit, and a main board. The first touch-sensing substrate has an active area and a peripheral area surrounding the active area. The peripheral area has a first connecting area and a second connecting area. The camera module is connected to the second connecting area. At least one of the transmission routes connects between the first connecting area and the second connecting area, and rest of the transmission routes respectively connect between the active area and the first connecting area. The flexible printed circuit has two ends. An end of the flexible printed circuit is connected to the first connecting area. The flexible printed circuit includes a touch-sensor driver. The touch-sensor driver is electrically connected to at least part of the transmission routes. The main board includes a connector. The connector is connected with the other end of the flexible printed circuit away from the first connecting area.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION

Figure 1:
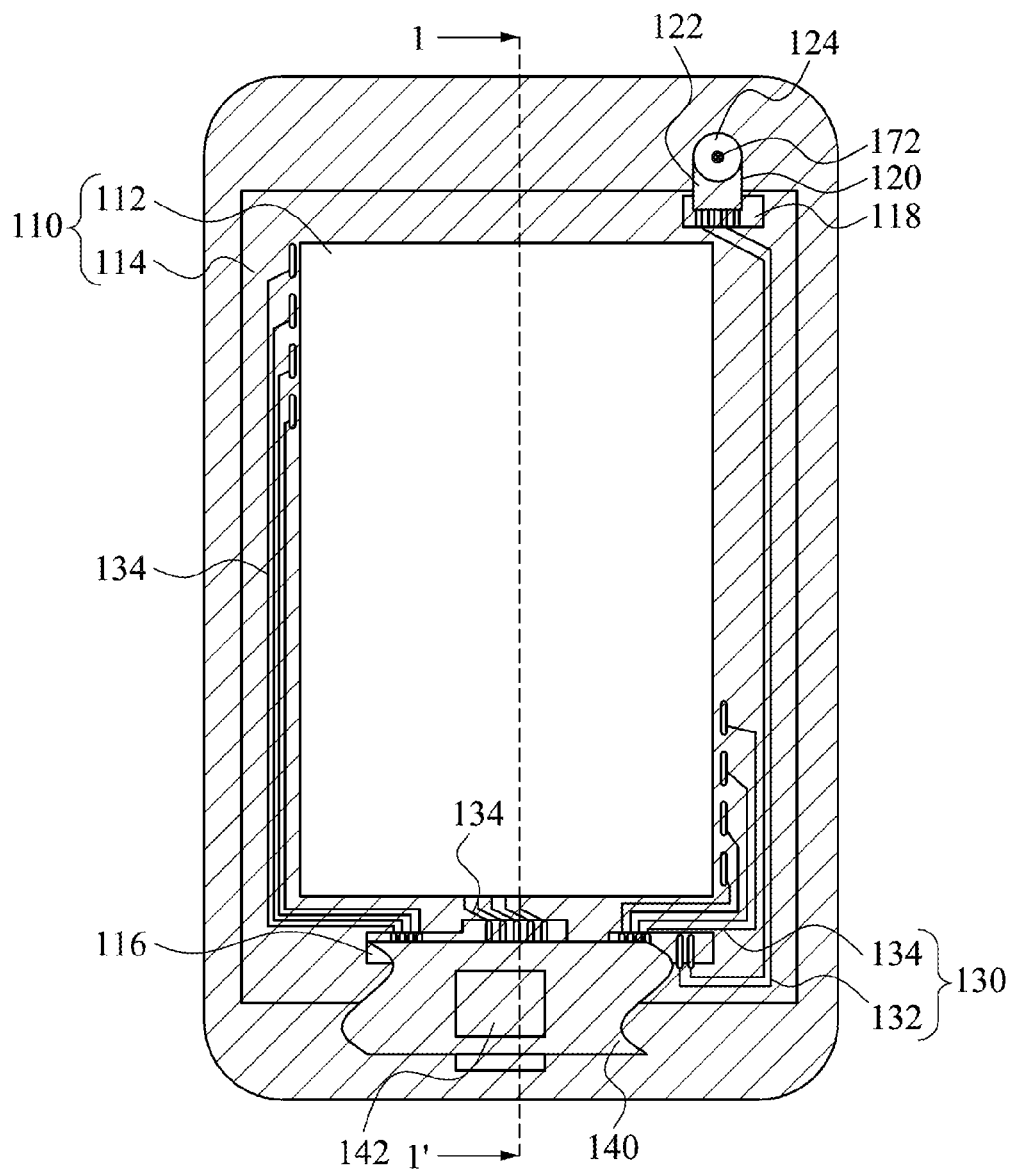
FIG. 1 is a top perspective view of a portable electronic apparatus according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts. It will be understood that when an element is referred to as being "on" another element, it can be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Figure 2:
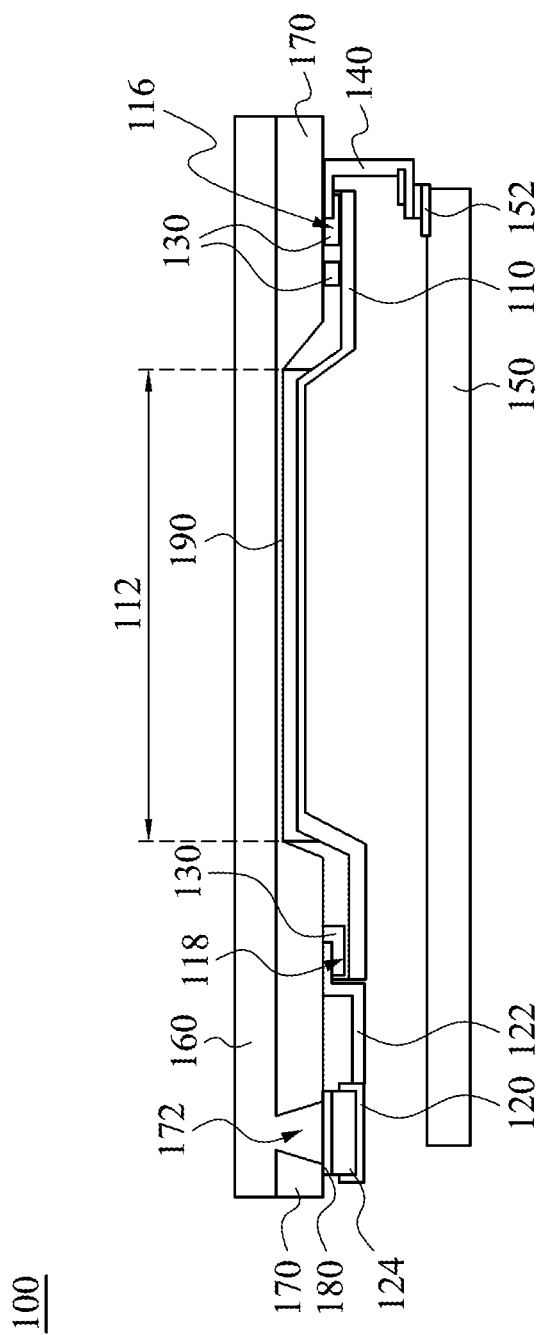
FIG. 2 is a longitudinal sectional view of a portable electronic apparatus, along segment 1-1' in FIG. 1, according to some embodiments of the present disclosure.

FIG. 1 illustrates a top perspective view of a portable electronic apparatus 100 according to some embodiments of the present disclosure. FIG. 2 illustrates a longitudinal sectional view of a portable electronic apparatus 100, along segment 1-1' in FIG. 1, according to some embodiments of the present disclosure. As shown in FIG. 1, the portable electronic apparatus 100 includes a first touch-sensing substrate 110, a camera module 120, transmission routes 130, a flexible printed circuit 140, and a main board 150 (as shown in FIG. 2). In some embodiments, material of the first touch-sensing substrate 110 can be glass, polymethylmethacrylate (PMMA), polycarbonate (PC), polyimide (PI), sapphire, silicon or other suitable transparent material. The first touch-sensing substrate 110 has an active area 112 and a peripheral area 114. The active area 112 is surrounded the peripheral area 114. The peripheral area 114 has a first connecting area 116 and a second connecting area 118. The camera module 120 is connected to the second connecting area 118. In some embodiments, the camera module 120 may be connected to the second connecting area 118 through a flexible printed circuit 122. In some embodiments, the camera module 120 may be connected to the second connecting area 118 through fixed pins.

In some embodiments, material of the transmission routes 130 can be metal or other suitable conductive material. In some embodiments, the transmission routes 130 can be fabricated in a single fabrication process. At least one of the transmission routes 130 connects between the first connecting area 116 and the second connecting area 118. In some embodiments, the transmission routes 130 may include at least one camera transmission route 132. Two ends of the camera transmission route 132 are connected to the first connecting area 116 and the second connecting area 118 respectively. The camera module 120 is electrically connected to the first connecting area 116 through the camera transmission route 132. The rest of the transmission routes 130 respectively connect between the active area 112 and the first connecting area 116. In some embodiments, the transmission routes 130 may include a touch-sensor transmission routes 134. Two ends of the touch-sensor transmission routes 134 may be connected to the active area 112 and the first connecting area 116 respectively. The flexible printed circuit 140 has two ends. An end of the flexible printed circuit 140 is connected to the first connecting area 116. The flexible printed circuit 140 includes a touch-sensor driver 142. The touch-sensor driver 142 is electrically connected to at least part of the transmission routes 130. In some embodiments, the touch-sensor driver 142 can be electrically connected to at least part of the touch-sensor transmission routes 134. As shown in FIG. 2, the main board 150 includes a connector 152. The connector 152 is connected with the other end of the flexible printed circuit 140 away from the first connecting area 116.

Owing to the camera module 120 and the touch sensor module, for example, a touch sensor module 190 as shown in FIG. 2, can be collectively connected to the flexible printed circuit 140 through the transmission routes 130, and moreover, the camera module 120 and the touch sensor module can further be collectively connected to the main board 150 through the flexible printed circuit 140. Therefore, the main board 150 of the portable electronic apparatus 100 can be respectively connected to the camera module 120 and the touch sensor module through a single connector 152, instead of installed another connector on the main board 150. As a consequence, while the fabrication process of the portable electronic apparatus 100 may be adopted, the cost of an additional connector component and the time for installed the connector component may both be saved. Furthermore, the transmission routes 130 can be fabricated under a single fabrication process without any other additional fabrication process.

In addition, owing to the main board 150 can be collectively connected to the camera module 120 and the touch sensor module through the single connector 152, so the space occupied by the additional connector can be released for other uses, for example, the main board 150 can accommodate other components. More specifically, integrating connecting routes of the camera module 120 and the touch sensor module into the flexible printed circuit 140 can simplify the fabrication process of fabricating a portable electronic apparatus, at the same time, limited space of the main board 150 can be further released for optimized usage.

In some embodiments, the first connecting area 116 and the second connecting area 118 can be respectively located at opposite sides of the active area 112. In other embodiments, the first connecting area 116 and the second connecting area 118 can be respectively located at adjacent sides of the active area 112. Moreover, in other embodiments, the first connecting area 116 and the second connecting area 118 can be located on the same side of the active area 112. It should be understood that, configurations of the first connecting area 116 and the second connecting area 118, described herein, is only for exemplary, and not intended to limit the present disclosure, which could be adjusted to actual demand by those skilled in the art, without departed from the scope or the spirits of the present disclosure. That is to say, a prerequisite of the first touch-sensing substrate 110 is that the active area 112, the first connecting area 116, and the second connecting area 118 cannot overlap, and the electronic signal on the active area 112, the first connecting area 116, and the second connecting area 118 can avoid being in interference with each other.

Due to the first connecting area 116 and the second connecting area 118 are respectively located at opposite sides of the active area 112. As a consequence, the camera module 120 connected to the second connecting area 118 can avoid or reduce the camera module 120 being influenced by interference from other components disposed within the portable electronic apparatus 100, such as electromagnetic interference (EMI) or cross-talk . . . etc. On the other hand, the camera module 120 is also prevented to influence other sensitive components, for example, the touch-sensor transmission routes 134.

In some embodiment, part of the transmission routes 130 connecting between the active area 112 and the first connecting area 116 are located between the active area 112, and the transmission routes connecting between the first connecting area 116 and the second connecting area 118. That is, part of the touch-sensor transmission routes 134 are disposed between the active area 112 and the camera transmission route 132. In some embodiments, the first touch-sensing substrate 110 may further comprises a shielding route (Not shown) disposed between the touch-sensor transmission routes 134 and the camera transmission route 132, to prevent or reduce the EMI and cross-talk between the touch-sensor transmission routes 134 and the camera transmission route 132.

Referring to FIG. 2, in some embodiments, the portable electronic apparatus 100 may further include a protective layer 160 and a decorative layer 170. The first touch-sensing substrate 110 is disposed between the protective layer 160 and the main board 150. In some embodiments, the protective layer 160 can be glass or other suitable transparent material, which can protect other components within the portable electronic apparatus 100. The decorative layer 170 is disposed between the protective layer 160 and the first touch-sensing substrate 110, and the decorative layer 170 is at least covered the peripheral area 114 of the first touch-sensing substrate 110. The decorative layer 170 is opaque, and formed on a surface of the protective layer 160 facing toward the first touch-sensing substrate 110, to cover the transmission routes 130 on the first touch-sensing substrate 110, or other components disposed inside the portable electronic apparatus 100, for example, the main board 150 and part of the camera module 120 . . . etc.

In some embodiments, the camera module 120 may further include a lens unit 124. The decorative layer 170 has an opening 172, and the lens unit 124 is aligned with the opening 172. Therefore, the lens unit 124 can receive light from outside the protective layer 160 for the camera module 120 to capture. In some embodiments, the portable electronic apparatus 100 may further includes an optical clear adhesive layer 180 configured to fixed the camera module 120. In part of embodiments, the optical clear adhesive layer 180 can be attached between the lens unit 124 and the opening 172. In addition, in part of embodiments, the lens unit 124 can be extended into the opening 172 (not shown), and the optical clear adhesive layer 180 is attached between the lens unit 124 and the protective layer 160. Therefore, the image quality of the camera module 120 can be improved. In some embodiments, the reflective index of the optical clear adhesive layer 180 can be 1.5 or other suitable value, depend on the lens unit 124. It should be understood that, the optical clear adhesive layer 180, described above, is only an exemplary, and not intended to limit the present disclosure, which could be adjusted to actual demand by those skilled in the art. The prerequisite of the optical clear adhesive layer 180 is to fix the lens unit 124, and keep the light from outside the protective layer 160 can be received by the camera module 120.

In part of the embodiments, the portable electronic apparatus 100 may further include the touch sensor module 190. The touch sensor module 190 can be formed on a surface of the first touch-sensing substrate 110 proximal to the protective layer 160. An outline of the touch sensor module 190 may define the active area 112. On the other hand, the combination of the first touch-sensing substrate 110 and the touch sensor module 190 can be regarded as a one glass solution (OGS) structure. In some embodiments, the touch sensor module 190 can be formed by a conductive material with greater diaphaneity, such as metal nano-wires, transparent metal oxide film or metal grid . . . etc.

Figure 3:
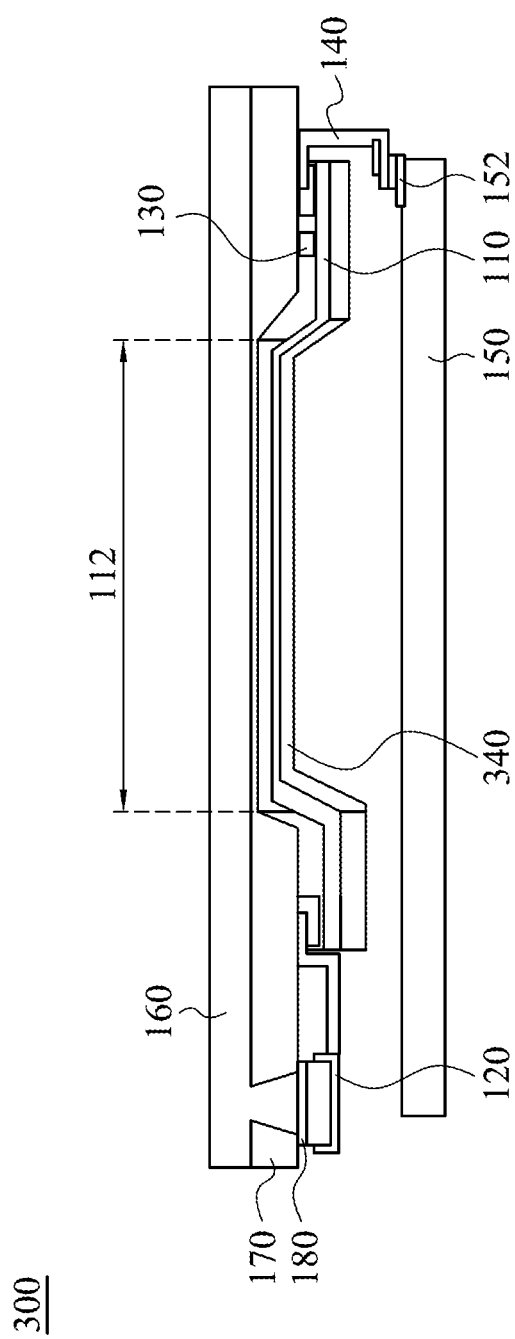
FIG. 3 is a longitudinal sectional view of a portable electronic apparatus according to another embodiments of the present disclosure.

FIG. 3 illutrates a longitudinal sectional view of a portable electronic apparatus 300 according to another embodiments of the present disclosure. In part embodiments, the portable electronic apparatus 300 may further include a first touch sensor film 320 and a second touch sensor film 340. The first touch sensor film 320 is formed on a surface of the first touch-sensing substrate 110 proximal to the protective layer 160. The second touch sensor film 340 is formed on a surface of the first touch-sensing substrate 110 facing away from the protective layer 160. At least one of outlines of the first touch sensor film 320 and the second touch sensor film 340 can define the active area 112. On the other hand, the combination of the first touch-sensing substrate 110, the first touch sensor film 320, and the second touch sensor film 340 may be regarded as a double indium tin oxide (DITO) structure. However, the material of the first touch sensor film 320, and the second touch sensor film 340 can be indium tin oxide, and is not limited the present disclosure. For example, in some embodiments, the first touch sensor film 320, and the second touch sensor film 340 can also be formed by another transparent metal oxide, such as indium zinc oxide (IZO), aluminum doped zinc oxide (AZO), aluminum indium oxide (AlO), indium oxide (InO) or gallium oxide (GaO) . . . etc.

Figure 4:
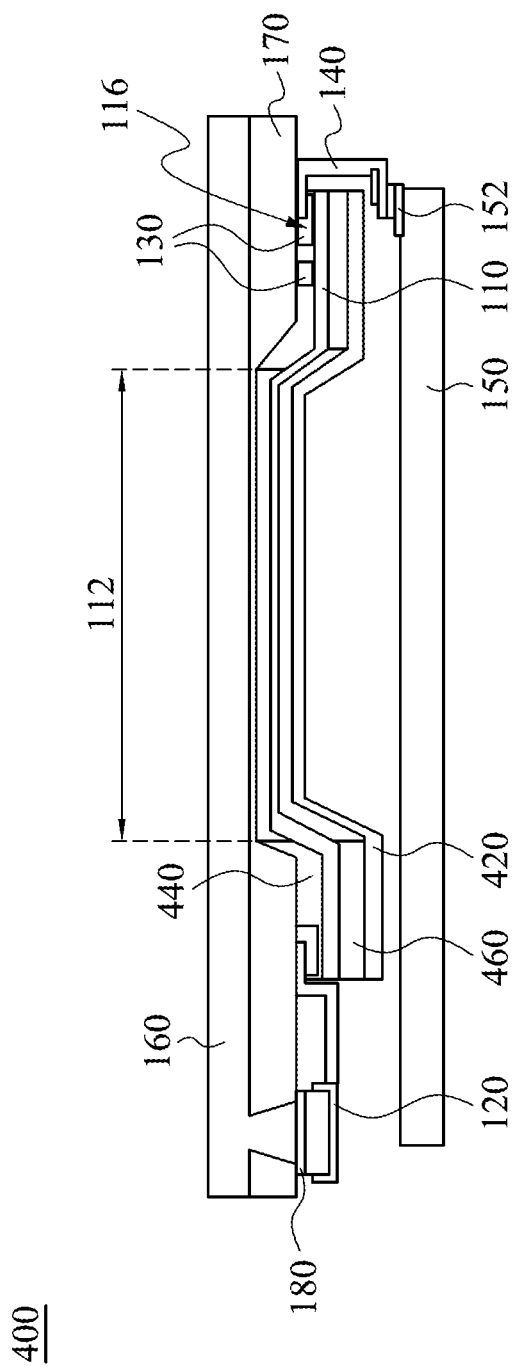
FIG. 4 is a longitudinal sectional view of a portable electronic apparatus according to another embodiments of the present disclosure.
Figure 5:
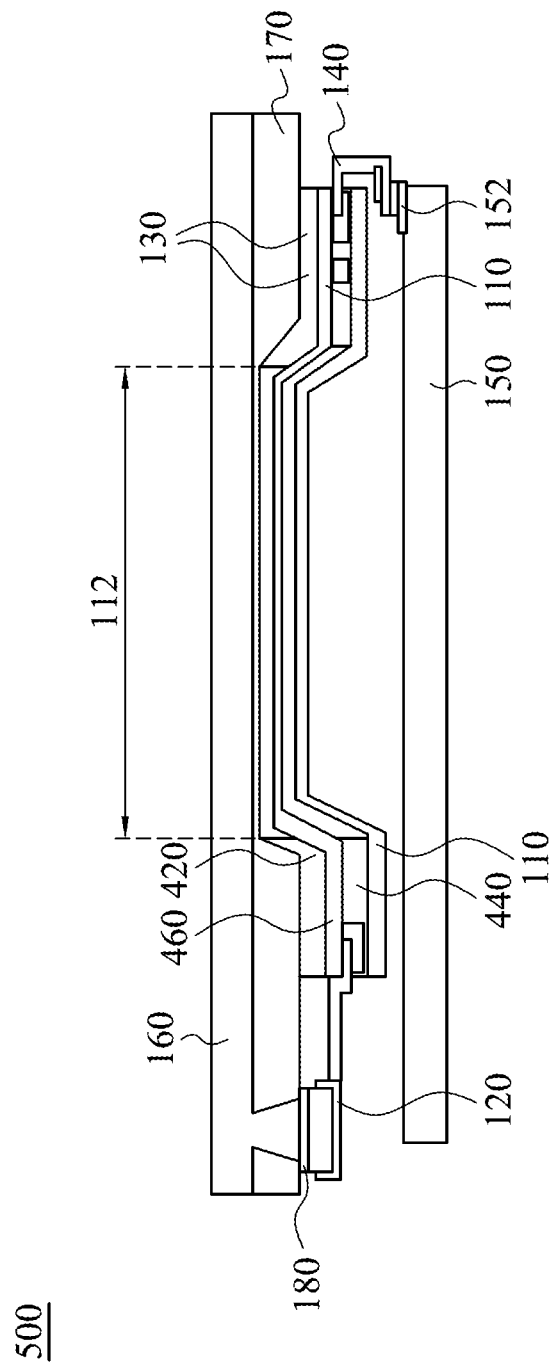
FIG. 5 is a longitudinal sectional view of a portable electronic apparatus according to other embodiments of the present disclosure.

FIG. 4 illustrates a longitudinal sectional view of a portable electronic apparatus 400 according to another embodiments of the present disclosure. FIG. 5 illustrates a longitudinal sectional view of a portable electronic apparatus 500 according to other embodiments of the present disclosure. As shown in FIG. 4, in some embodiments, the portable electronic apparatus 400 may further include a second touch-sensing substrate 420, a first touch sensor film 440, and a second touch sensor film 460. The second touch-sensing substrate 420 is disposed between the protective layer 160 and the main board 150. In some embodiments, material of the second touch-sensing substrate 420 can be glass, polymethylmethacrylate, polycarbonate, polyimide, sapphire, silicon or other suitable transparent material. In some embodiments, the first touch sensor film 440 is formed on a surface of the first touch-sensing substrate 110 proximal to the protective layer 160. The second touch sensor film 460 is formed on a surface of the second touch-sensing substrate 420 proximal to the protective layer 160. At least one of outlines of the first touch sensor film and the second touch sensor film defines the active area 112. On the other hand, the combination of the second touch-sensing substrate 420, the first touch sensor film 440, and the second touch sensor film 460 can be regarded as a Glass-film-film structure. In some embodiments, the first touch sensor film 440, and the second touch sensor film 460 can be formed by conductive material with greater diaphaneity, such as metal nano-wires, transparent metal oxide film or metal grid . . . etc.

As shown in FIG. 4, in some embodiments, the first touch-sensing substrate 110 can be located between the second touch-sensing substrate 420 and the protective layer 160. As shown in FIG. 5, in other embodiments, the second touch-sensing substrate 420 can be located between the first touch-sensing substrate 110 and the protective layer 160.

It should be noted that, although the portable electronic apparatus 400, in FIG. 4, or the portable electronic apparatus 500, in FIG. 5, may include touch-sensing substrates and films disposed on the touch-sensing substrates, for example, the first touch-sensing substrate 110, the second touch-sensing substrate 420, the first touch sensor film 440, and the second touch sensor film 460, while, the transmission routes 130 of the portable electronic apparatus 400 or the portable electronic apparatus 500 can connect to the first connecting area 116, and the flexible printed circuit 140 may collectively connect each of the transmission routes 130 to the main board 150.

Summarized from the above, the present disclosure provides a portable electronic apparatus. The portable electronic apparatus includes a first touch-sensing substrate, a camera module, transmission routes, a flexible printed circuit, and a main board. The first touch-sensing substrate has an active area and a peripheral area surrounding the active area. The peripheral area has a first connecting area and a second connecting area. The camera module is connected to the second connecting area. At least one of the transmission routes connects between the first connecting area and the second connecting area, and rest of the transmission routes respectively connect between the active area and the first connecting area. The flexible printed circuit has two ends. An end of the flexible printed circuit is connected to the first connecting area. The flexible printed circuit includes a touch-sensor driver. The touch-sensor driver is electrically connected to at least part of the transmission routes. The main board includes a connector. The connector is connected with the other end of the flexible printed circuit away from the first connecting area. Therefore, the portable electronic apparatus can integrate the transmission routes of the camera module and the touch sensor module within a single connector, reducing the cost of the connector and saving time for setting the connector to the main board.

Although some embodiments of the present disclosure and their advantages have been described in detail, it should be understood that various changes, substitutions, and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, fabricate, composition of matter, means, methods, and steps described in the specification. As one of ordinary skill in the art will readily appreciate from the disclosure of the present disclosure, processes, machines, fabricate, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, fabricate, compositions of matter, means, methods, or steps.

What is claimed is:

1. A portable electronic apparatus, comprising:
   a first touch-sensing substrate having an active area and a peripheral area surrounding the active area, wherein the peripheral area has a first connecting area and a second connecting area;
   a camera module connected to the second connecting area;
   a plurality of transmission routes, wherein at least one of the transmission routes connects between the first connecting area and the second connecting area, and rest of the transmission routes respectively connect between the active area and the first connecting area;
   a flexible printed circuit having two ends, an end of the flexible printed circuit being connected to the first connecting area, and the flexible printed circuit comprising a touch-sensor driver electrically connected to at least part of the transmission routes; and
   a main board comprising a connector being connected with the other end of the flexible printed circuit away from the first connecting area.

2. The portable electronic apparatus of claim 1, wherein the first connecting area and the second connecting area are respectively located at opposite sides of the active area.

3. The portable electronic apparatus of claim 1, wherein part of the transmission routes connecting between the active area and the first connecting area are located between the active area and the transmission routes, connecting between the first connecting area and the second connecting area.

4. The portable electronic apparatus of claim 1, further comprising:
   a protective layer, wherein the first touch-sensing substrate is disposed between the protective layer and the main board; and
   a decorative layer disposed between the protective layer and the first touch-sensing substrate, the decorative layer being at least covered the peripheral area of the first touch-sensing substrate.

5. The portable electronic apparatus of claim 4, wherein the camera module comprises a lens unit, the decorative layer has an opening, and the lens unit is aligned with the opening.

6. The portable electronic apparatus of claim 5, further comprising an optical clear adhesive layer attached between the lens unit and the opening.

7. The portable electronic apparatus of claim 5, wherein the lens unit is extended into the opening, the portable electronic apparatus further comprising an optical clear adhesive layer attached between the lens unit and the protective layer.

8. The portable electronic apparatus of claim 4, further comprising a touch sensor module formed on a surface of the first touch-sensing substrate proximal to the protective layer, an outline of the touch sensor module defines the active area.

9. The portable electronic apparatus of claim 4, further comprising:
   a first touch sensor film formed on a surface of the first touch-sensing substrate proximal to the protective layer; and
   a second touch sensor film formed on a surface of the first touch-sensing substrate facing away from the protective layer,
   wherein at least one of an outline of the first touch sensor film and an outline of the second touch sensor film defines the active area.

10. The portable electronic apparatus of claim 4, further comprising:
    a second touch-sensing substrate disposed between the protective layer and the main board;
    a first touch sensor film formed on a surface of the first touch-sensing substrate proximal to the protective layer; and
    a second touch sensor film formed on a surface of the second touch-sensing substrate proximal to the protective layer,
    wherein at least one of an outline of the first touch sensor film and an outline of the second touch sensor film defines the active area.

11. The portable electronic apparatus of claim 10, wherein the second touch-sensing substrate is located between the first touch-sensing substrate and the protective layer.

12. The portable electronic apparatus of claim 10, wherein the first touch-sensing substrate is located between the second touch-sensing substrate and the protective layer.

* * * * *